March 12, 1963

R. H. LIVESAY 3,081,031

CALCULATING APPARATUS FOR PRICE AND VOLUME INDICATORS

Filed March 18, 1958

INVENTOR.
ROBERT H. LIVESAY
BY

ATTORNEYS

INVENTOR
ROBERT H. LIVESAY
ATTORNEYS

March 12, 1963 R. H. LIVESAY 3,081,031
CALCULATING APPARATUS FOR PRICE AND VOLUME INDICATORS
Filed March 18, 1958 3 Sheets-Sheet 3

INVENTOR.
ROBERT H. LIVESAY
BY

ATTORNEYS

United States Patent Office 3,081,031
Patented Mar. 12, 1963

3,081,031
CALCULATING APPARATUS FOR PRICE AND VOLUME INDICATORS
Robert H. Livesay, Wilmington, Del., assignor to Sun Oil Company, Philadelphia, Pa., a corporation of New Jersey
Filed Mar. 18, 1958, Ser. No. 722,211
5 Claims. (Cl. 235—160)

This invention relates to calculating apparatus particularly adapted for effecting multiplication, division, evaluation of summations of multiplied quantities, evaluation of integrals, etc.

The present invention particularly relates to calculating apparatus in which pulses are counted in a fashion which, though statistical in nature, will give rise to results which may be made as accurate as desired. It may be generally characterized by a statement that it involves a source of pulses routed to a plurality of channels with selection in the several channels of particular fractions of the pulses therein with accumulation of the pulses so resulting. The adoption of this procedure results in effective multiplication in various ways which will be hereafter described, and further extensions of the system are adapted for use in effecting division. Summation and integration of products may also be provided. In particular, the procedure lends itself to simplicity of decimal representations such as are usually most desirable.

In one of its simplest forms, the invention is applicable to the computations of prices of fuels delivered to vehicle tanks, effecting in simple fashion the multiplication of volume delivered by unit volume price. At the present time, gasoline stations are provided with the conventional "pumps" which involve meters providing inputs to mechanical variators involving complex gearing and set for the prices of unit volumes. The mechanical interconnections involved require, practically, that the pumps should be located adjacent to the vehicles being serviced, and this results in the conventional physical lay-out of gasoline stations. In accordance with the present invention, the lay-out of such stations may be advantageously modified with considerable savings in space by providing relatively simple overhead hose delivery arrangements with remote computation of prices which may be exhibited on conveniently located boards. For a given number of delivery hose and nozzle arrangements, there may be provided a considerably less number of calculating or computing devices which may be selectively switched to the delivery stations. As a result, the entire station equipment may be made much less expensive.

As will appear, the invention is of much more general applicability and may be used, for example, for effecting continuous multiplication of two variables with summation or integration of the products over particular periods.

The various objects of the invention relate generally to the foregoing and to various details of apparatus and operation which will become more apparent from the following description, read in conjunction with the accompanying drawings, in which.

Figure 1:
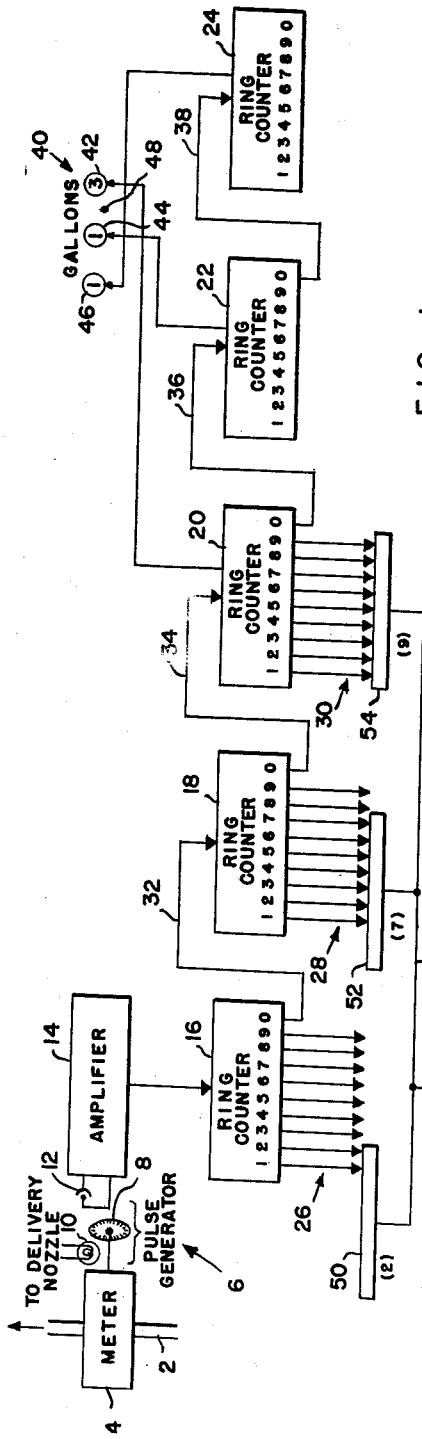
FIGURE 1 is a diagram showing an embodiment of the invention particularly adapted to the multiplication of a variable quantity with an adjusted fixed quantity, the diagram being illustrative of the application of the invention to the dispensing and pricing of fuel.

There will first be described with reference to FIGURE 1 an embodiment of the invention adapted to the type of multiplication involved in calculation of the price of a delivered fuel. Following description of FIGURE 1 there will then be discussed the theory of operation involved.

There is indicated at 2 a fuel line leading to a delivery nozzle by which the fuel may be introduced into a vehicle tank. The line 2 includes a conventional volumetric meter 4 which is provided with an output shaft the rotations of which correspond to the quantity of fuel delivered. The output shaft drives a pulse generator 6 to provide electrical pulses corresponding in number to the quantity of fuel measured by the meter. To cite a typical figure, the pulse generator may produce one-thousand pulses per gallon. The pulse generator may take numerous forms and is illustrated as involving a slotted disc 8 driven by the meter output shaft arranged to interrupt a beam of light passing from a lamp 10 to a photocell 12 which is connected to an amplifier 14. As will be obvious, there might be here used for pulse generation a magnetized disc having pulse locations thereon associated with a magnetic pickup, mechanical interrupter means, or the like. The amplifier 14 may be provided with conventional means to provide at its output properly shaped pulses.

The output pulses are delivered to a first stage ring counter 16 which is followed by a series of similar ring counters at 18, 20, 22 and 24. These ring counters are here merely diagrammed since they may take numerous well known forms. They may, for example, consist of conventional series of binary units provided by thermionic tubes, they may be counters of transistor type, or, in a quite simple form, they may consist of gas filled tubes having electrodes arranged in a circular series to provide, upon the reception of pulses, stepping about of the fired conditions of the electrodes as in the well-known "Decatron." In the case of each of these counters, the final stage is coupled back to the first stage so that the digit count is repetitive. Though not indicated in the figure, it will be understood that these counters have conventional zeroizing means associated therewith so that at the beginning of each period of operation their counts may start from zero. Such ring counters are also provided with outputs designed to deliver pulses upon the reaching of each new count, and such connections are illustrated for the first three ring counter stages at 26, 28 and 30. The ring counters are staged by the interconnections 32, 34, 36 and 38 so that each counter delivers to the next following one a single pulse when it reaches a count of ten, it being assumed in the present instance that the counters are decade counters since it is desired to provide the results in a decimal system. (It will become evident, without further discussion, that the counters and their associated parts may be arranged for the ultimate exhibition of a price in non-decimal monetary systems.) Associated with the last three ring counters may be exhibiting devices as indicated at 40 indicative of the total volume of fuel delivered. For this purpose the indicating devices 42, 44 and 46 are respectively connected to the three final ring counter stages 20, 22 and 24. These indicators may be in the form of gas tubes containing electrodes in the forms of numerals to show directly, by glass glow, the pertinent digits. A decimal point 38 may be provided in the form of a continuously glowing gas tube. This exhibition of total fuel delivered may, of course, be provided by mechanical counters coupled in conventional fashion to the ring counters.

The various output leads at 26, 28 and 30, one of each group corresponding to each significant digit in its ring counter, are connected to contact points which may be selectively switched by means of switch elements 50, 52 and 54 which are connected to the common line 56. These switches are arranged as diagrammed, so that, for example in the case of switch 50, the lead corresponding to the digit 1 in the ring counter may be connected, or the two leads corresponding to the digits 1 and 2, or other series ranging from 1 to the highest digit for which seting is desired. For example, as shown, the contact 50 engages the leads corresponding to digits 1 and 2 and, as will appear, has a setting corresponding to a digit 2 in the tens place of the price per gallon in cents. In similar fashion, the switch element 52 is in a position corresponding to seven cents. The switch element 54 is in a position corresponding to 0.9 cent. The total price per gallon corresponding to the settings illustrated is 27.9 cents.

Pulses emitted from the common line 56 pass to the conventional decimal counter 58 which provides an output to a total price exhibiting means indicated at 60 and which may take one of the forms described above with reference to the quantity indicator 40. A decimal point is provided at 62 and the exhibited total price shown in FIGURE 1 is 3.152 dollars, the price being given to the tenth of a cent.

It will be evident from what has been described, that of the pulses entering the ring counter 16 two pulses out of every ten will be delivered to the line 56. Since only every tenth pulse entering the ring counter 16 will enter the counter 18, it will be evident that this last counter emits to the line 56 seven out of every hundred pulses entering counter 16. In similar fashion the counter 20 will provide for the setting illustrated to the line 56 nine pulses for every thousand entering the ring counter 16. It may be here noted that since the counter 16 does not emit a pulse to the line 56 when a pulse is delivered to the counter 18, the same being true with respect to the counters 18 and 20, the several counters will never emit simultaneously any plurality of pulses to the line 56. There is thus no necessity for the provision of any "anti-coincidence" arrangement of the type frequently used in other apparatus to avoid improper counting when pulses may be emitted simultaneously.

The theory of operation will now be given.

A number M is represented in the decimal scale as:

$$M = 10^n p_n + 10^{n-1} p_{n-1} + \ldots 10 p_1 + p_0 + 10^{-1} p_{-1} + \ldots$$

wherein the p's are digits (0 to 9) in the various orders.

Its product with N, with inclusion of a decimal scale factor $10^{n+1}$ is then:

$$\frac{N \cdot M}{10^{n+1}} = N \cdot \frac{p_n}{10} + N \cdot \frac{p_{n-1}}{10^2} + \ldots N \cdot \frac{p_1}{10^n}$$
$$+ N \cdot \frac{p_0}{10^{n+1}} + N \cdot \frac{p_{-1}}{10^{n+2}} + \ldots$$

Suppose, then, that a quantity $$\frac{N}{10^{n+1}}$$

to be multiplied by a second quantity M is measured by a number of pulses in such fashion that a unit value of the first quantity there corresponds $10^{n+1}$ pulses. Then the right hand side of the last equation represents a number of pulses which when counted gives a measure of the product. It will be noted that each of the fractions multiplying N, the number of pulses, is less than unit.

To take a very simple example of possible use of the invention, consider the representation of the total price of $$\frac{N}{10^{n+1}}$$

gallons of gasoline at M cents per gallon to be exhibited on a dispensing "pump" or on a panel associated with a pump. If pulses are generated by a meter at the rate, say, 1,000 pulses per gallon, $10^{n+1}$ may be 1,000. Suppose the price M is fixed to the tenth of a cent per gallon, say 27.9 cents, and the total price is to be given to the tenth of a cent. Then $p_n = 2$, $p_{n-1} = 7$, $p_{n-2} = 9$ and the subsequent p's are zero. Assume in a particular delivery there are delivered 11.3 gallons. The total number of pulses then produced in the delivery will be 11,300.

Suppose, now, that provision is made for the deliveries of fractions of the total number of pulses corresponding to the fractions $$\frac{p_n}{10}, \frac{p_{n-1}}{10^2}, \text{etc.}$$

Then the right hand side of the last equation becomes:

$$11{,}300 \cdot \tfrac{2}{10} + 11{,}300 \cdot \tfrac{7}{100} + 11{,}300 \cdot \tfrac{9}{1000}$$

which, to the extent of the integral number of pulses represented by each term is:

$$2260 + 791 + 101 = 3152$$

If these pulses are counted on a decimal counter with the decimal point suitably assigned, the total price is given as $3.152, accurate to the tenth of a cent.

Considering, now, the application of the foregoing to a gasoline station, it will be recognized that at any usual gasoline station the "duty cycle" of the computing apparatus is quite low; i.e., actual delivery of gasoline occupies only a small fraction of total time. Even assuming that the gasoline station has a large volume of business and to avoid delays in servicing it may require, for example, ten delivery stations provided with fuel hoses and nozzles, it would be quite unlikely that more than four of these would actually be delivering gasoline at any one time. Even though more than four vehicles were present, sevices other than the actual delivery of gasoline would be involved for major portions of their stays. Thus, except for abnormal overload conditions it would suffice to have no more than four computing devices, certainly no more than the number of attendants present. It will be evident, therefore, that selective switching devices of quite obvious character may be provided whereby the computing devices may be selectively connected to the individual meters and pulse generators corresponding to the delivery nozzles. Interconnection may, of course, be provided to prevent delivery of fuel unless a computing device is switched to the particular delivery unit and is available for price calculation. Indicators such as 40 and 60 may be provided individual to the delivery nozzles, these being involved in the selective switching. The entire system thus involves saving of computing devices as well as much simplification of the gasoline station lay-out. The computers may be housed in the service building, and the vehicles may be routed for service into parallel areas each having associated with it an overhead support for a delivery hose and nozzle and confronted with indicators such as 40 and 60 observable by the driver and the servicing attendant. The required land area for the gasoline station may thus be reduced far below that which is presently conventional for an equivalent service capacity.

The system which has been described is very readily adapted to the different fashions in which fuel is delivered.

Some customers will request filling of the tank. This may be automatically achieved by interruption of the filling by switching means when the tank is filled by the use, for example, of the arrangement described in the application of Shawhan, Serial No. 716,757, filed February 21, 1958, now Patent No. 2,918,095, dated December 22, 1959.

Other customers may request the delivery of a certain number of gallons or of a quantity of fuel amounting to a certain price. These later requirements may be satisfied by providing automatic stopping when the indication of the ring counters 20, 22 and 24 or of the decimal counter 58 reach certain values. These provisions are not indicated in FIGURE 1 since, as described below in FIGURE 3, there may be provided a device for interrupting operation under such conditions.

In an operation such as that above described, the quantity M is a constant throughout one operation. But that is not necessarily involved in the application of the present invention which may be applied to the approximate evaluation of an integral or summation of the type $$\int_0^T M.N.dt$$

in which M and N are variable with time. In this case, the pulses may be generated at a suitably high rate per second in proportion to the value of M. (This, of course, would be the case in the example already given in which the number of pulses per second corresponds to the rate of gasoline delivery.) The value of M as it varies with time would then involve corresponding variations of the value of the p's. The result then would be the summation over the integration interval of groups of pulses, each corresponding to a small subperiod between changes of digits of M. It will be evident that the summation, approximating the integration, will be statistical in nature with possible losses of pulses during transitions of the apparatus used; but with transition periods of minimum durations and suitable high frequencies of pulses, the statistical approximation may be made extremely good.

Figure 2:
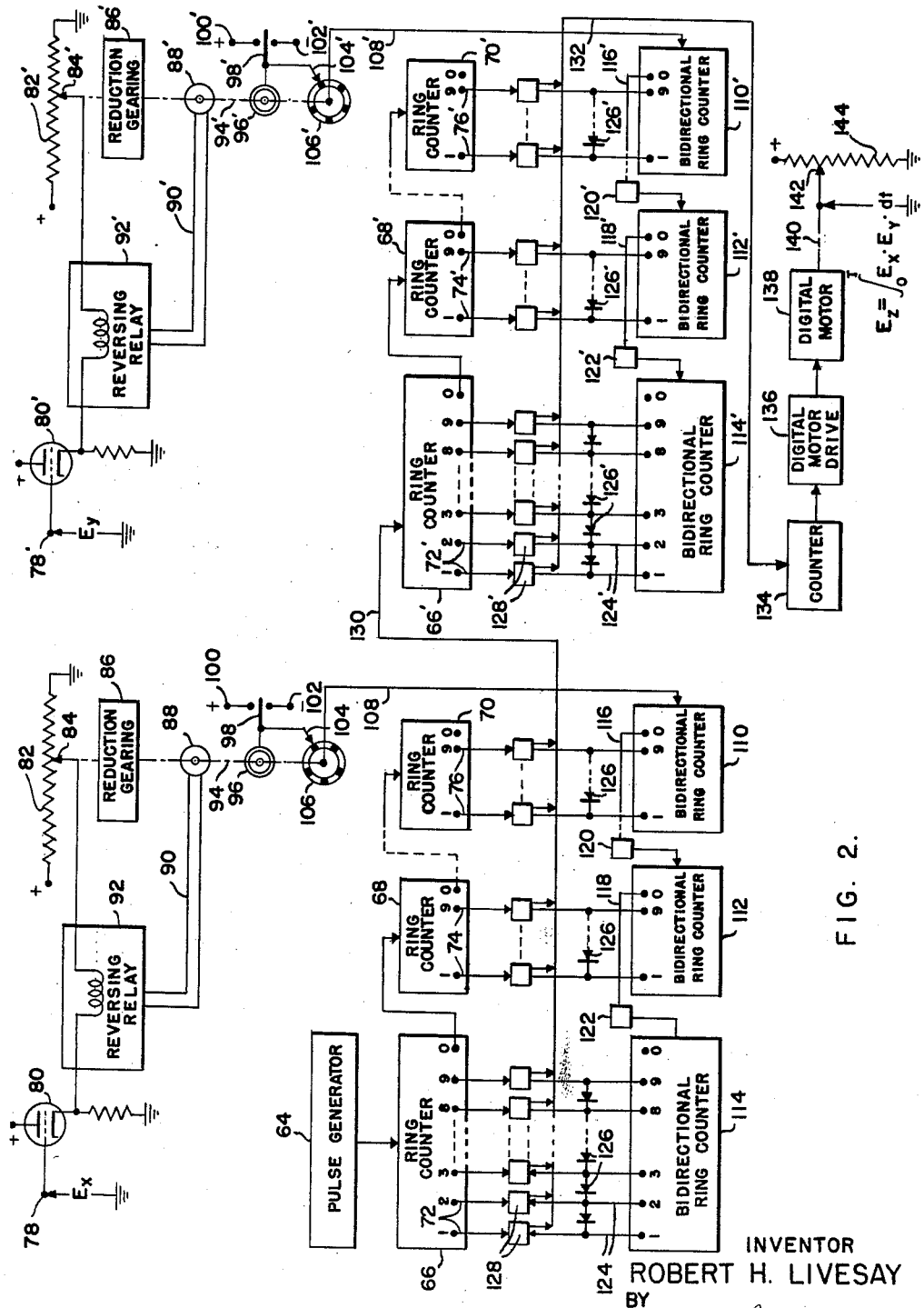
FIGURE 2 is a diagram illustrating a further embodiment of the invention particularly adapted for the continuous multiplication of two variable quantities to provide summation or integration, the diagram also showing the fashion in which the invention is adapted to receive inputs from analog devices and provide an analog output.

FIGURE 2 illustrates an apparatus for performing the type of summation or integration just mentioned. To indicate the generality obtainable, FIGURE 2 illustrates an apparatus in which the input signals to be multiplied originate in the form of variable voltages such as might be provided from an electrical analog. Further, the apparatus is shown as delivering a variable potential which may then be used as an input to an analog system.

A pulse generator 64 is arranged to deliver pulses at a constant suitably high frequency. This provides an input to a modulating system which controls the number of pulses emitted during a unit interval in proportion to an input voltage, the modulated pulse train becoming, then, the equivalent of such an input pulse train as is delivered from the amplifier 14 in FIGURE 1 which involves the direct generation of pulses at a rate proportional to a variable.

The generator 64 delivers its pulses to a ring counter 66 which forms the first of a series indicated at 66, 68 and 70 which may be of any number desired for the problems involved and which correspond in their interconnections and characteristics with the counters 16 to 24 in FIGURE 1. As in the case of FIGURE 1, the ring counters have output connections 72, 74 and 76 corresponding to the individual digits 1 to 9. (In a case such as that being now specifically described it may not be of importance to have involved a decimal system, and it will be understood that any desired system may be employed.)

One of the variables to be multiplied is provided by the potential $E_x$ which is shown as introduced between input terminal 78 and ground. The input is delivered to a cathode follower 80.

A linear potentiometer 82 is connected between a positive supply terminal and ground and has its movable contact 84 driven through reduction gearing 86 by a reversible motor 88 connected at 90 to a reversing relay 92 arranged to change the direction of rotation of the motor depending upon whether the potential at contact 84 is higher or lower than the output potential of the cathode follower 80. The motor 88 may be of alternating or direct current type but desirably has a high rate of rotation in comparison with the movement imparted to the contact 84 for the sake of securing high accuracy.

The motor shaft 94 carries a drum which is surrounded by a friction band 96 which carries a plurality of switch arms of which one is illustrated at 98, others providing reversing switches which are indicated at 120 and 122 and which will be hereafter described but are not shown in the diagram as connected to the friction band 96. The switch arm 98 operates through a limited range of motion between contacts respectively connected to positive and negative supply terminals 100 and 102. The switch arm 98 is electrically connected to a brush 104 bearing on commutator segments 106 mounted on the shaft 94 and connected together and to a line 108.

The operation of the matter just described is as follows:

The operation of motor 88 under control of the reversing relay 92 is such as to maintain equality between the potential at 84 and the potential at the cathode of the cathode follower 80 which is substantially proportional to the input potential $E_x$. (If the maintenance of a high degree of equality is desired, the cathode follower 80 may, of course, be replaced by a circuit arrangement which will maintain almost precisely equal the potential at 84 and $E_x$, such as an arrangement involving a high gain differential amplifier.) If the position of the contact 84 starts from ground, the total movement at any time will be reflected in the net positive pulses delivered at 108 through the commutator and brush arrangement, and the number of pulses thus delivered is proportional to the input potential. The arrangement of switch 98 is such that positive pulses will be emitted when the motor rotates to drive the contact 84 in the positive direction and negative pulses will be emitted when the drive is in the opposite direction. When the input voltage does not change the net pulse count remains constant, and as will immediately appear this maintains constant the switching set-up which routes the pulses from the ring counters.

The line 108 feeds its pulses to the first bidirectional ring counter 110 of a series indicated at 110, 112 and 114 corresponding individually to the ring counters but in reverse order. Each of these bidirectional ring counters is of a type which will count upward on receipt of positive pulses and downward on receipt of negative pulses. The first ring counter 110 receivers the positive and negative pulses from the commutator 106 directly. The second counter 112 receivers its pulses through connection 116 when the first ring counter passes through zero, and to provide positive or negative pulses depending upon the direction of change, there may be involved switching devices such as 120 and 122 which may be controlled by the friction band 96, so, alternatively, the introduction of positive or negative pulses may be electrically controlled in dependence upon whether the zero of the counter 110 is reached from a count of 1 or from a count of 9. The arrangement, in any form, is such that the group of counters 110, 112 and 114 will all count upward or downward depending upon the introduction at 108 of positive or negative pulses.

The respective bidirectional counters control switching of their corresponding ring counters of the group 66 to 70 in the fashion which may be best described by considering the corresponding counters 66 and 114. Each of the output terminals 72 of counter 66 is connected to an input terminal of an "and" gate 128. The other input terminal of each of these gates is connected to one of the digital outputs of the bidirectional counter 114 as indicated at 124. Between the successive connections 124 there are arranged the diodes 126. Assuming that as the successive counts of counter 114 are reached the output terminals thereof are individually positive, the result will be that the counter will provide a positive input to all of the gates up to and including that corresponding to the count. For example, assuming that the terminal corresponding to the count of 8 is energized, all of the gates corresponding to counts of 1 to 8 have their input terminals on the side of the counter 114 energized. The gates are such that when so energized they will deliver pulses to the line 130 whenever pulses are received from the ring counter 66. It will be evident, on comparing this action with that involving the switch 50 in FIGURE 1, that the gates 128 correspond in groups to the positions which the contact 50 may assume, but due to the fact that the gates are electrically controlled there is no limit to the rapidity of change of switching imposed by any mechanical connections, and the switching may accordingly follow rapid changes in the valve of the input potential $E_x$ limited only by the rapidity with which the motor 88 may effect balancing at the potentiometer 82.

It will be noted that the line 130 receives pulses from the gates associated with all of the ring counters 66 to 70. It should be here noted, to avoid confusion, that what has just been described is merely a means for modulating the pulses in number in correspondence with the input potential. In a sense, multiplication is here involved, but it is with the quantity unity in view of the constant frequency of pulses provided by the generator 64. The connection 130 is, essentially, equivalent to the input to the first ring counter 16 in FIGURE 1.

At the right of FIGURE 2 the apparatus illustrated is identical with that at the left and will, acordingly, not be described in detail, the corresponding parts being designated by the same numerals primed. In the case of the right hand arrangement, the other of the variables to be multiplied $E_y$, is introduced between ground and the terminal 78'. Between the input at 130 and the output at 132 there occurs precisely the same type of multiplying action as was described in connection with FIGURE 1, the output connection 132 corresponding to 56 of FIGURE 1. Since the frequency of pulses introduced at 130 is proportional to the value of $E_x$, and since the switching corresponds to the instantaneous values of the input $E_y$, it will be evident that multiplication continuously occurs in accordance with the theory heretofore discussed with the result that a counter 134 receiving the input from line 132 accumulates (as an approximating summation) the value of the integral which is shown in FIGURE 2 applied to the terminal connected to the potentiometer contact 142. If a digital evaluation of this integral is desired, the apparatus may terminate with the counter 134. However, if it is desired to recover a potential $E_z$ for use in further analog operations or for indication on a meter, the output from the counter 134 may operate a digital motor drive indicated at 136 which in turn drives a digital motor 138 the shaft 140 of which adjusts a contact 142 on the potentiometer 144 connected between a positive supply terminal and ground. The digital motor drive 136 takes the same form as a bidirectional ring counter, and a suitable circuit for effecting the results desired will be described hereafter with reference to FIGURE 4.

A potential corresponding to $E_z$ might also be provided by applying to suitable summing resistors (through diodes blocking reverse current flows) potentials from the elements of the counter 134.

It may be noted that the apparatus shown in FIGURE 2 to the left of connection 130 may be varied depending upon the type of input which might replace $E_x$. For example, if the variable input was to be a measure of a flow, there could be used directly a variable frequency pulse input arrangement of the type shown in FIGURE 1. If high accuracy was not required other systems generating pulses at frequency rates dependent upon a variable to be multiplied might provide the pulses on line 130, for example, multivibrators are known with frequency outputs, through at least limited ranges, proportional to applied direct potentials. Such an arrangement might well be provided to supply the pulses introduced through line 130. In such cases the right hand portion of FIGURE 2 would be of interest to provide for rapid variation of switching at rates in excess of those which could be secured through the mechanical switching arrangement of FIGURE 1.

The arrangement specifically illustrated in FIGURE 2 is adapted for "first quadrant" multiplaction, i.e., multiplication in which the introduced variables are of the same sign. It will be at once apparent that if the variables have both positive and negative values provisions may be made for suitable switching to provide an output which at all times has a proper sign, these provisions providing positive and negative outputs at 132 delivered to a counter 134 which, in such case, would be bidirectional. The switching, of course, would be such that so long as $E_x$ and $E_y$ have the same sign, the output pulses would be positive while if they were of opposite signs the output pulses would be negative, the terms "positive" and "negative" being here used in the sense of effects on the counter rather than in the sense of actually being positive or negative potentials with respect to ground. The necessary switching arrangements will be obvious, certain of the ground connections in the system then being returned instead to supply terminals negative with respect to ground, as for example, the returns of the cathode follower resistances and the right hand terminals of the potentiometers 82 and 82'.

Figure 3:
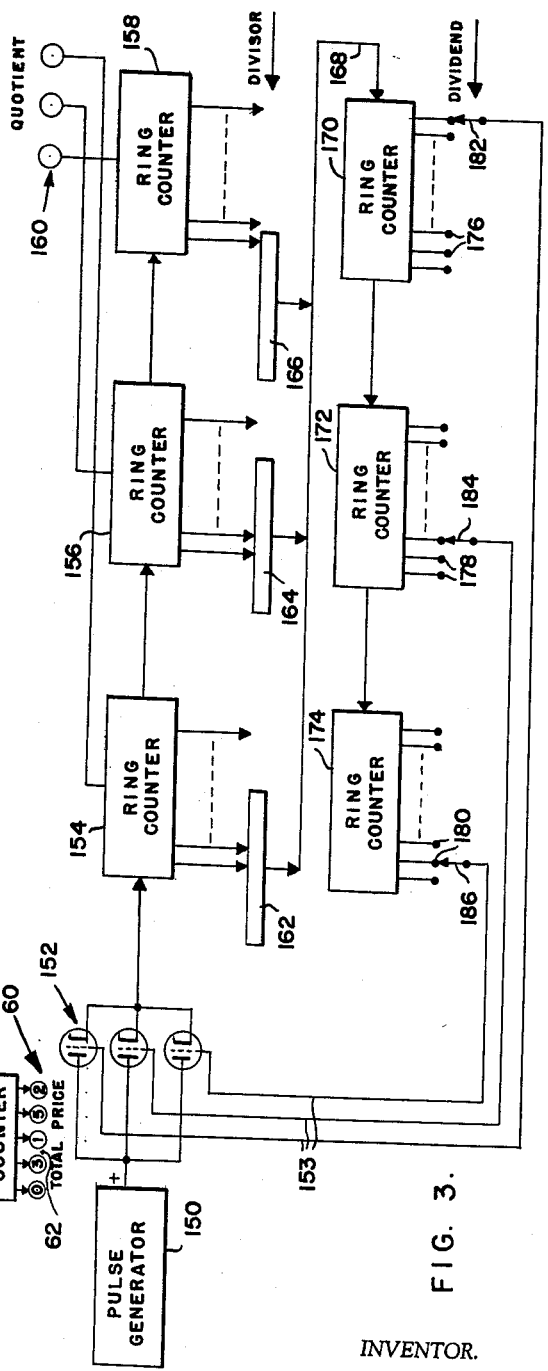
FIGURE 3 is a diagram showing the application of the invention to division.

The application of the invention to the process of division is illustrated in FIGURE 3. The arrangement here illustrated is in general similar to that illustrated in FIGURE 1, though it will be obvious that the more elaborate arrangement of FIGURE 2 may be used. The process of division consists, essentially, in multiplying a divisor by an input (which ultimately becomes the quotient) until the product acquires the value of the dividend. For this purpose, a pulse generator 150, which may be assumed to deliver positive pulses, provides its pulses through an "or" gate 152 to the first ring counter 154 of a group 154, 156, 158 corresponding to those shown in FIGURE 1. Any type of "or" gate 152 may be here used but it is exemplified as comprising parallel triodes capable individually of passing the positive pulses and shutting off the supply of positive pulses to the ring counter 154 only when all three grids are driven to cut off by negative potentials applied to lines 153.

The outputs of the ring counters are associated with the variable switches 162, 164 and 166 corresponding to the switches 50, 52 and 54. Indicators 160 connected to the ring counters are arranged to exhibit the final digits composing the quotient. If the switches 162, 164 and 166 are arranged to correspond to the divisor, the counts represented by the input pulses are multiplied, effectively, by the divisor to provide a product output at 168. This ouput is delivered to the series of ring counters 170, 172, and 174 which have their outputs connected to the groups of terminals 176, 178 and 180 which are selectively engageable by the switch arms 182, 184 and 186 connected by the lines 153 to the grids of the gate tubes. The switches 182, 184 and 186 are set to correspond to the digits of the dividend. Assuming the outputs from the ring counters to be so chosen as to be negative, the negative outputs being sufficient to cut off the triodes of the gate, it will be evident that pulses will be delivered from the generator until the product with the divisor reaches the value of the dividend whereupon all three of the triodes will be cut off to stop the delivery of pulses. The quotient will then be indicated at 160. Of course, any desired number of stages may be used to satisfy requirements.

The portion of FIGURE 3 consisting of the ring counters 170, 172 and 174 and the setting arrangements provided by the switch arms 182, 184 and 186 are also illustrative of the fashion in which a gasoline dispensing computer such as that shown in FIGURE 1 may terminate the delivery of fuel upon the attainment of a predetermined quantity or price. By connection either to the counters such as 20, 22 and 24 or to the counter 58, the attainment of predetermined accumulations may control a gate such as 152 to cause either energization or deenergization of a relay to operate a valve to cut off flow of fuel. This procedure, of course, is essentially one of division. For example, in the case of stoppage on attainment of a predetermined price, the price is the dividend, the unit price is the divisor, and the quantity of gasoline is the quotient.

Figure 4:
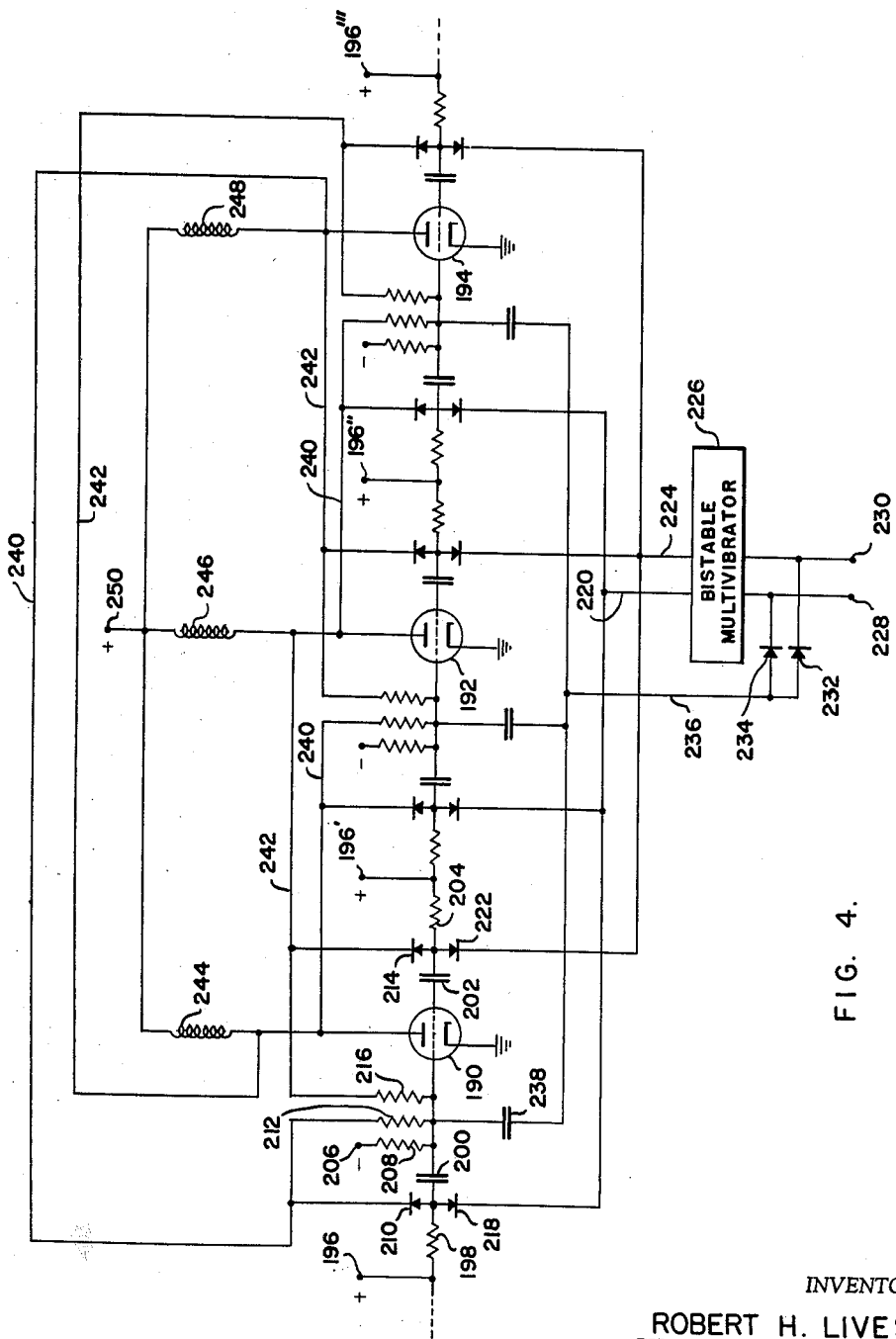
FIGURE 4 is a diagram illustrating a bidirectional ring counter and a digital motor.

FIGURE 4 illustrates both a bidirectional ring counter such as has been referred to heretofore and also a digital motor drive such as indicated at 136 in FIGURE 2. For simplicity of description, three stages are shown as would be involved in a digital motor drive, but it will be obvious that the number of stages may be indefinitely increased to provide a decimal counter or any such other bidirectional counter as may be required.

Three triodes 190, 192 and 194 are connected in a circuit involving corresponding elements associated with each triode and similar interconnections which will be readily apparent from the figure. There will be described those elements which are particularly associated with the triode 190.

A positive supply terminal 196 is connected to the grid of triode 190 through the resistor 198 and capacitor 200. The grid is also connected through a capacitor 202 and resistor 204 to the positive supply terminal 196' which is connected to the same source as 196. The connections to the succeeding triodes are the same between 196' and 196''; between 196'' and 196''', etc.

A negative supply terminal 206 is connected through resistor 208 to the grid of triode 190. A diode 210 has its positive terminal connected to the junction of resistor 198 and capacitor 200, and its negative terminal is connected through resistor 212 to the grid of triode 190. A diode 214 has its positive terminal connected to the junction of resistor 204 and capacitor 202 and has its negative terminal connected to the grid of triode 190 through resistor 216. A diode 218 has its positive terminal connected to the junction of resistor 198 and capacitor 200 and its negative terminal to the output terminal 220 of a bistable multivibrator 226. A diode 222 has its positive terminal connected to the junction of resistor 204 and capacitor 202 and has its negative terminal connected to the other output terminal 224 of the multivibrator 226. The input terminals 228 and 230 of the multivibrator 226 are so connected, as through the secondary of a transformer, that positive signals from a source such as the line 108 of FIGURE 2 will provide a positive pulse at one of these terminals and a negative pulse at the other while a negative pulse will provide a reversal of these inputs. The bistable multivibrator is thus of a type that the first positive input pulse will place it in one of its stable states and this state will be maintained so long as positive input pulses are received. On the other hand when a negative impulse is received the state will be reversed and will be maintained until a positive pulse is received. The control thus effected provides alternatively forward or reverse counting of the counter. The terminals 228 and 230 are connected to the negative terminals of diodes 232 and 234, the positive terminals of which are connected together and through line 236 to a capacitor 238 leading to the grid of triode 190. The various connections to the triode 190 are repeated for the triodes 192 and 194 and such other ones as may be involved.

Interconnections between the triodes are provided through the lines 240 and 242, it being noted that in the three stage arrangement shown the third stage is connected to the first as if to a subsequent stage. Each connection 240 is between the anode of one stage to the grid of the next stage through a resistor corresponding to 212. Each connection 242 is from the anode of one stage through a resistance corresponding to 216 to the grid of the preceding stage.

The cathodes of the triodes are grounded, the ground being the reference for the positive and negative supply potentials referred to.

In the use of the bi-directional counter as a digital motor drive, the anode loads are constituted by the phase windings 244, 246 and 248 which are connected to the positive supply potential terminal 250. The digital motor is here considered to be of D.C. type having the three phase windings and a field provided by a permanent magnet or by a D.C. winding connected between positive and negative supply terminals.

Resistors and potentials are so chosen that at any time only one of the triodes of the counters is conducting and hence only one of the phase windings is energized, positioning the rotor of the motor. When the bistable multivibrator is in a state so that the terminal 224 has a high positive potential compared to the terminal 220, successive negative pulses received through the line 236 from that terminal 228 or 230 which is receiving negative pulses will be applied through the capacitors 238 to the grids of the triodes. A negative pulse applied to the triode which is conducting will cut off this triode and render the next subsequent triode conducting. Pulses applied to the non-conducting triodes will be ineffective. Thus upon receipt of each pulse there will be a count in a forward direction in the counter. On the other hand, if the multivibrator terminal 220 has the high positive potential state, counting will take place in the reverse direction. A digital motor may thus be driven forwardly and backwardly step by step upon the receipt of each pulse. When the bi-directional counter is not used to operate a motor, positive or negative signals may be taken from suitable parts of the counter. In such case, the anode loads may be constituted by resistors. The variations of connections for more stages than three will be obvious from the foregoing.

Bidirectional counters of other types may, of course, be employed, in connection with the invention.

What is claimed is:

1. In combination, a plurality of individual ring-type recirculating counters each having therein a position corresponding to a full counting cycle; each individual counter having a plurality of output connections coupled directly to individual stages in the corresponding counter, the output connections thus providing individual output pulses from the several stages in the respective counters; connections from the said position of each individual counter save the last to the input of the next succeeding counter, thereby to sequentially stage the counters so that each individual counter save the last provides an input actuating pulse to its succeeding counter only upon completion of a full counting cycle; means providing input actuating pulses to only the first of said counters, a single common output terminal, and individual switching means comprising gates and ring counters controlling the states of said gates, said individual switching means being singly associated with each respective one of the first-mentioned counters and operating to simultaneously connect selectively to said output terminal a plurality of said output connections of the individual first-mentioned counters.

2. A combination according to claim 1, including also means for converting a continuously variable signal into corresponding pulses, and means delivering the last mentioned pulses to actuate said ring counters controlling the states of said gates.

3. In combination, a plurality of individual ring-type recirculating counters each having therein a position corresponding to a full counting cycle; each individual counter having a plurality of output connections the number of which is one less than the number of stages in the corresponding counter, said output connections being coupled directly to individual stages in the corresponding counter, the output connections thus providing individual output pulses from the several stages in the respective counters; connections from the said position of each individual counter save the last to the input of the next succeeding counter, thereby to sequentially stage the counters so that each individual counter save the last provides an input actuating pulse to its succeeding counter only upon completion of a full counting cycle; means providing input actuating pulses to only the first of said counters, said means operating to automatically modulate the frequency of occurrence of the last-named actuating pulses in accordance with a time-variable signal; a single common output terminal, and individual switching means singly associated with each respective counter and controllable to simultaneously connect selectively to said output terminal a plurality of said output connections of the individual counters.

4. In combination, a plurality of individual ring-type recirculating counters each having therein a position corresponding to a full counting cycle; each individual counter having a plurality of output connections the number of which is one less than the number of stages in the corresponding counter, said output connections being coupled directly to individual stages in the corresponding counter, the output connections thus providing individual output pulses from the several stages in the respective counters; connections from the said position of each individual counter save the last to the input of the next succeeding counter, thereby to sequentially stage the counters so that each individual counter save the last provides an input actuating pulse to its succeeding counter only upon completion of a full counting cycle; means providing input actuating pulses to only the first of said counters, a single common output terminal, individual switching means singly associated with each respective counter and controllable to simultaneously connect selectively to said output terminal a plurality of said output connections of the individual counters, and means automatically controlling said switching means in accordance with the value of a time-variable signal.

5. In combination, a plurality of individual ring-type recirculating counters each having therein a position corresponding to a full counting cycle; each individual counter having a plurality of output connections the number of which is one less than the number of stages in the corresponding counter, said output connections being coupled directly to individual stages in the corresponding counter, the output connections thus providing individual output pulses from the several stages in the respective counters; connections from the said position of each individual counter save the last to the input of the next succeeding counter, thereby to sequentially stage the counters so that each individual counter save the last provides an input actuating pulse to its succeeding counter only upon completion of a full counting cycle; means providing input actuating pulses to only the first of said counters, a single common output terminal, and individual switching means singly associated with each respective counter and controllable to simultaneously connect selectively to said output terminal a plurality of said output connections of the individual counters.

References Cited in the file of this patent

UNITED STATES PATENTS

| 2,758,787 | Felker | Aug. 14, 1956 |
| 2,774,534 | Dunn | Dec. 18, 1956 |
| 2,833,476 | Hayes et al. | May 6, 1958 |
| 2,844,790 | Thompson et al. | July 22, 1958 |
| 2,892,526 | Devand | June 30, 1959 |
| 2,913,179 | Gordon | Nov. 17, 1959 |
| 2,961,160 | Bell et al. | Nov. 22, 1960 |
| 2,963,222 | Allen | Dec. 6, 1960 |

FOREIGN PATENTS

| 654,313 | Great Britain | June 13, 1951 |

OTHER REFERENCES

Slaughter: An Analog-To-Digital Converter With an Improved Linear-Sweep Generator, Convention Record of March 23–26, 1953, IRE National Convention, Part 7 (April 1953), pp. 7 to 12.

Packer: Dynamic Binary Counter With Analog Read-Out, Convention Record of the March 23–26, 1953 IRE National Convention, Part 7 (April 1953), pp. 13–19.

Brierley: An Industrial Batching Counter, Electronic Engineering (April 1954), vol. XXVI, No. 314, pp. 157 to 162.